US009112290B2

(12) United States Patent
Matsushita

(10) Patent No.: US 9,112,290 B2
(45) Date of Patent: Aug. 18, 2015

(54) TERMINAL-EQUIPPED WIRE

(75) Inventor: Kouichiro Matsushita, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/388,092

(22) PCT Filed: Aug. 25, 2010

(86) PCT No.: PCT/JP2010/064850

§ 371 (c)(1),
(2), (4) Date: Jan. 31, 2012

(87) PCT Pub. No.: WO2011/025046

PCT Pub. Date: Mar. 3, 2011

(65) Prior Publication Data

US 2012/0125684 A1 May 24, 2012

(30) Foreign Application Priority Data

Aug. 25, 2009 (JP) ................................ 2009-194254

(51) Int. Cl.
*H02G 15/02* (2006.01)
*H01R 4/62* (2006.01)
*H01R 4/18* (2006.01)

(52) U.S. Cl.
CPC . *H01R 4/62* (2013.01); *H01R 4/185* (2013.01)

(58) Field of Classification Search
CPC .................................. H01R 4/62; H01R 4/185
USPC ........................................................ 174/74 R
See application file for complete search history.

(56) References Cited

U.S. PATENT DOCUMENTS

| | | | | | |
|---|---|---|---|---|---|
| 2,379,567 | A * | 7/1945 | Buchanan | ..................... | 439/868 |
| 2,758,491 | A * | 8/1956 | Buchanan | ..................... | 72/416 |
| 2,815,497 | A * | 12/1957 | Redslob | ..................... | 439/203 |
| 8,245,396 | B2 * | 8/2012 | Kondo et al. | ..................... | 29/863 |
| 8,641,461 | B2 * | 2/2014 | Mitose et al. | ..................... | 439/877 |
| 2011/0225820 | A1 | 9/2011 | Kondo et al. | | |

FOREIGN PATENT DOCUMENTS

| | | | |
|---|---|---|---|
| DE | 199 02 405 | A1 | 8/2000 |
| JP | 1-231213 | A | 9/1989 |
| JP | 4-192213 | A | 7/1992 |
| JP | 9161937 | A | 6/1997 |
| JP | 11121075 | A | 4/1999 |
| JP | 2000268642 | A | 9/2000 |
| JP | 2002141118 | A | 5/2002 |
| JP | 2003-249127 | A | 9/2003 |

(Continued)

OTHER PUBLICATIONS

International Search Report (PCT/ISA/210) dated Dec. 23, 2010, issued in International Application No. PCT/JP2010/064850.

(Continued)

*Primary Examiner* — William H Mayo, III
*Assistant Examiner* — Hiram E Gonzalez
(74) *Attorney, Agent, or Firm* — Sughrue Mion, PLLC

(57) ABSTRACT

A terminal-equipped wire includes a wire and a terminal. The wire includes a core wire and an insulative sheath covering a part of the core wire. The core wire has a plurality of conductive element wires. The terminal includes a wire connection portion connected to the core wire at an end part of the wire where the core wire is exposed. Outer surfaces of the element wires and the wire connection portion are tinned.

1 Claim, 5 Drawing Sheets

(56) References Cited

FOREIGN PATENT DOCUMENTS

| | | | |
|---|---|---|---|
| JP | 2005-50736 | A | 2/2005 |
| JP | 2008181713 | A | 8/2008 |
| JP | 2009-152052 | A | 7/2009 |
| WO | 98/31022 | A1 | 7/1998 |

OTHER PUBLICATIONS

Written Opinion (PCT/ISA/237) dated Dec. 23, 2010, issued in International Application No. PCT/JP2010/064850.

Office Action, dated Nov. 29, 2013, issued by the State Intellectual Property Office of the People's Republic of China in counterpart Chinese Application No. 201080037569.5.

Office Action, dated Oct. 29, 2013, issued by the Japanese Patent Office in counterpart Japanese Application No. 2009-194254.

Office Action dated Jan. 15, 2014, issued by the Japanese Patent Office in counterpart Japanese Application No. 2009-194254.

Office Action dated Jul. 10, 2014, issued by the State Intellectual Property Office of the People's Republic of China in counterpart Chinese Application No. 201080037569.5.

* cited by examiner

TERMINAL-EQUIPPED WIRE

This application is a National Stage entry of PCT/JP2010/064850, filed Aug. 25, 2010, which claims priority from Japanese Application No. 2009-194254, filed Aug. 25, 2009, the disclosures of which are incorporated herein by reference in their entirety.

TECHNICAL FIELD

This invention is related to a terminal-equipped wire including a wire having a conductive core wire and an insulative sheath covering the core wire, and a terminal fixedly secured to an end portion of the wire to be electrically connected to the wire.

BACKGROUND ART

Various electronic equipments are mounted on an automobile or the like serving as a mobile body. Therefore, wire harnesses are installed on the automobile or the like so as to transmit to these electronic equipments electric power from a power source (such as a battery) and control signals, etc., from a computer, etc. The wire harness includes a plurality of wires, and terminals fixedly secured respectively to end portions of these wires.

The wire is a so-called sheathed wire including a core wire composed of a plurality of conductive element wires twisted together into a round cross-section, and an insulative sheath covering the core wire. The terminal is formed of a conductive metal sheet or the like, and includes a wire connection portion to which the wire is electrically and mechanically connected, and an electrical contact portion adapted to be electrically and mechanically connected to the above electronic equipment.

In order to achieve a lightweight design of the above wire harness, there has been proposed a terminal-equipped wire (see, PTL 1) in which element wires of a core wire are made of aluminum or aluminum alloy. In the terminal-equipped wire disclosed in PTL 1, a sheath is removed from an end portion of the wire to thereby expose the core wire at this end portion, and an exposed portion of the core wire is superposed on a flat plate portion of a wire connection portion of a terminal. Ultrasonic vibration is applied to the exposed core wire portion and the flat plate portion by a known ultrasonic welding machine, so that the core wire and the flat plate portion are welded together. Accordingly the terminal is fixedly secured to the end portion of the wire in electrically-connected relation thereto.

In the terminal equipped-wire disclosed in the above-mentioned PTL 1, however, the core wire is formed by twisting the plurality of element wires together, and therefore those of the plurality of element wires disposed at a central portion of the core wire are not held in contact with the terminal. Therefore, the electrical resistance of those of the plurality of element wires held out of contact with the terminal tended to increase. Furthermore, the element wires are made of aluminum or aluminum alloy, and generally an oxide film is liable to develop on their surfaces, and also the element wires are equal to each other in the degree of deformation. Therefore friction was less liable to develop between the element wires, so that it was difficult to remove the oxide film between the element wires, and therefore it was difficult to keep the electrical resistance between the plurality of element wires to a low level.

CITATION LIST

Patent Literature

[PTL 1] JP-A-2005-50736

SUMMARY OF INVENTION

Technical Problem

The terminal-equipped wire disclosed in the above PTL 1 had a problem that it was difficult to obtain stable electrical connection between the core wire of the wire and the terminal.

Solution to Problem

It is therefore one advantageous aspect of the present invention to provide a terminal-equipped wire in which stable electrical connection between a core wire of the wire and a terminal can be positively obtained.

According to one aspect of the invention, there is provided a terminal-equipped wire including:

a wire including a core wire and an insulative sheath covering a part of the core wire, the core wire having a plurality of conductive element wires; and a terminal including a wire connection portion connected to the core wire at an end part of the wire where the core wire is exposed, wherein outer surfaces of the element wires and the wire connection portion are tinned.

The wire connection portion may include a pair of crimping pieces; and a bottom plate, disposed between the pair of the crimping pieces, and having a face on which the exposed core wire is mounted, so that the core wire is crimped by the pair of crimping pieces and the bottom plate. Faces of the pair of the crimping pieces opposing each other and the face of the bottom plate may be tinned.

Advantageous Effects of Invention

As described above, the electrical resistance between the plurality of element wires can be reduced, and also the electrical resistance between the plurality of element wires and the wire connection portion can be reduced, and therefore the stable electrical connection between the core wire of the wire and the metal terminal can be positively obtained.

In the present invention, the portion of the wire connection portion to which the tinning is applied can be reduced, and therefore the increase of the cost due to the tinning applied to the metal terminal can be suppressed.

DESCRIPTION OF EMBODIMENTS

One preferred embodiment of a terminal-equipped wire of the present invention will now be described with reference to FIGS. 1 to 3. The terminal-equipped wire 1 of this embodiment includes a wire 2, and an LA terminal 7 (serving as a terminal) fixedly secured to an end portion 2*a* of the wire 2.

Figure 1:
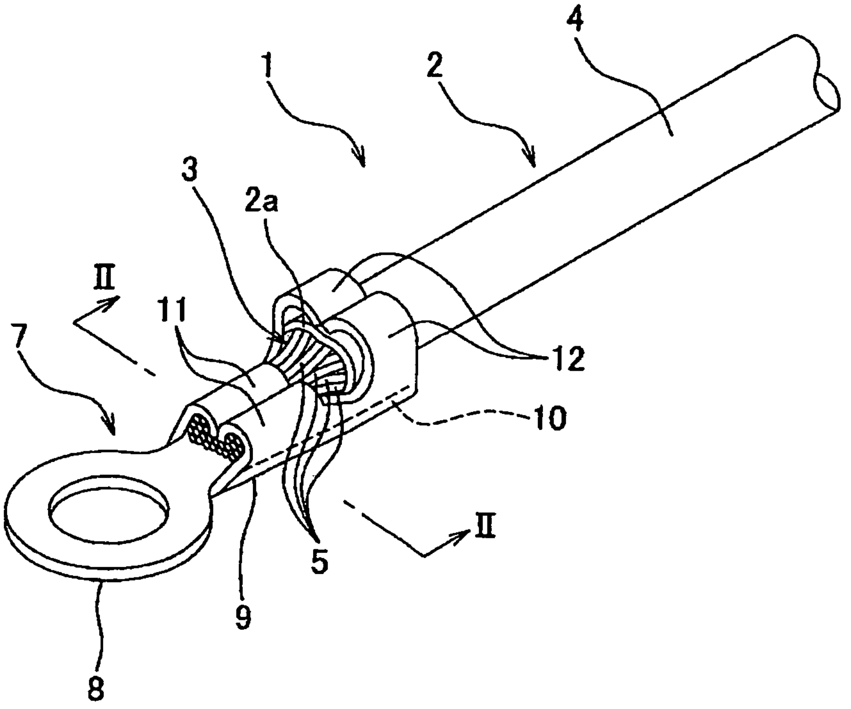
FIG. 1 is a perspective view of one preferred embodiment of a terminal-equipped wire of the present invention.
Figure 2:
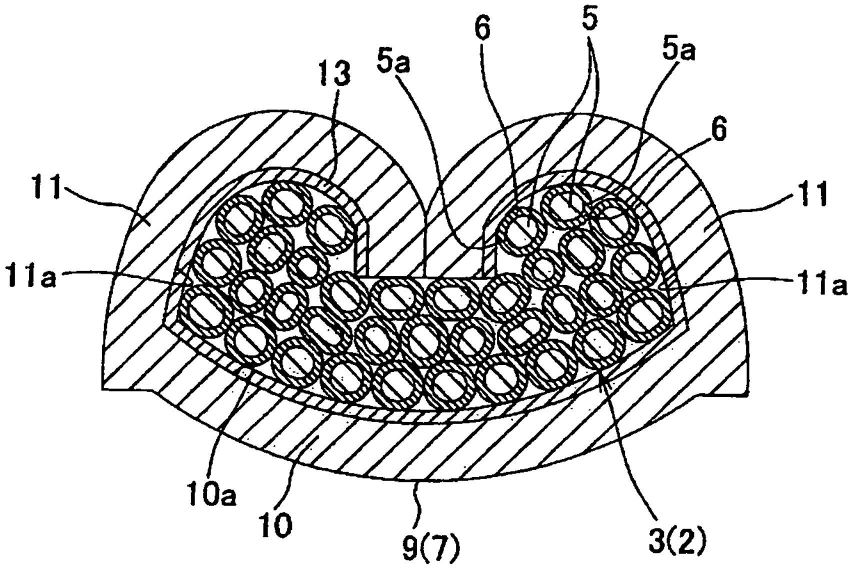
FIG. 2 is a cross-sectional view taken along the line II-II of FIG. 1.
Figure 3:
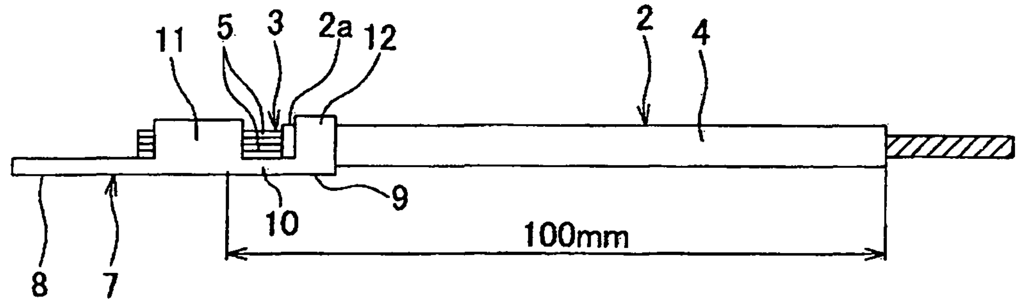
FIG. 3 is a side-elevational view of the terminal-equipped wire shown in FIG. 1.
Figure 4:
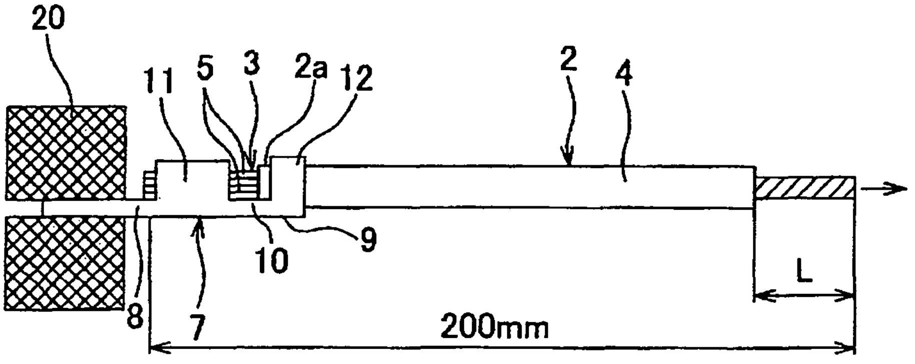
FIG. 4 is an explanatory view showing a condition in which the terminal-equipped wire of FIG. 3 is set on a testing device.

As shown in FIGS. 1 and 3, the wire 2 includes a conductive core wire 3, and an insulative sheath 4. The core wire 3 is composed of a plurality of element wires 5 twisted together into a round cross-section, the element wires 5 being made of conductive metal such as copper, copper alloy, aluminum or aluminum alloy. Each of the plurality of element wires 5 has a tin plating 6 formed on an outer surface 5*a* thereof. The sheath 4 is made of a synthetic resin, and covers the plurality of element wires 5, that is, the core wire 3. The sheath 4 has an annular or circular cross-section.

The wire 2 includes the core wire 3, and the sheath 4, and is formed into a round cross-section. The sheath 4 is removed from the end portion 2*a* of the wire 2, so that the core wire 3 is exposed at this end portion 2*a*.

The LA terminal 7 includes a relatively-thick metal sheet or plate, and includes an electrical contact portion 8, and a wire connection portion 9 formed integrally with the electrical contact portion 8. The electrical contact portion 8 is formed into a ring-shape and has a central hole, and this electrical contact portion 8 is electrically connected to a mating terminal (not shown) or the like by a bolt (not shown) passing through the central hole and threaded in a nut.

The wire connection portion 9 includes a bottom plate portion 10, a pair of core wire crimping piece portions 11, and a pair of sheath crimping piece portions 12. The bottom plate portion 10 is formed into a plate-shape, and has a tin plating 13 formed on its surface 10*a*. The end portion 2*a* of the wire 2 is located on the tin plating 13 formed on the surface 10*a* of the bottom plate portion 10.

The pair of core wire crimping piece portions 11 are formed on and extend upwardly respectively from widthwise-opposite side edges of the bottom plate portion 10. A tin plating is formed on each of opposed inner surfaces 11*a* of the pair of core wire crimping piece portions 11. The pair of core wire crimping piece portions 11 are bent toward the bottom plate portion 10 to crimp that portion of the core wire 3 exposed at the end portion 2*a* of the wire 2. The pair of core wire crimping piece portions 11 correspond to a pair of crimping piece portions recited in the appended claims.

The pair of sheath crimping piece portions 12 are formed on and extend upwardly respectively from the widthwise-opposite side edges of the bottom plate portion 10. The pair of sheath crimping piece portions 12 are bent toward the bottom plate portion 10 to crimp that portion of the sheath 4 disposed at the end portion 2*a* of the wire 2. At this time, distal ends of the pair of sheath crimping piece portions 12 remote from the bottom plate portion 10 contact each other.

The end portion 2*a* of the wire 2 is located or set on the tin plating 13 formed on the surface 10*a* of the bottom plate portion 10 of the wire connection portion 9 of the LA terminal 7 of the above construction, and then the pair of core wire crimping piece portions 11 are bent toward the bottom plate portion 10 to crimp the portion of the core wire 3 exposed at the end portion 2*a*, and also the pair of sheath crimping piece portions 12 are bent toward the bottom plate portion 10 to crimp the portion of the sheath 4 disposed at the end portion 2*a*. By doing so, the LA terminal 7 is fixedly secured to the end portion 2*a* of the wire 2.

The sheath 4 is removed from the end portion 2*a* of the wire 2, and then the LA terminal 7 is fixedly secured to the end portion 2*a*, so that the terminal-equipped wire 1 of the above construction is provided. The terminal-equipped wire 1 is electrically connected to the mating terminal (not shown) or the like.

Accordingly, in other words, each of the pair of crimping piece portions 11 has the face 11*a* opposing each other; and the bottom plate portion 10 is disposed between the pair of the crimping pieces and has the face 10*a* on which the exposed core wire 3 is mounted, so that the core wire 3 is crimped by the pair of crimping piece portions 11 and the bottom plate portion 10.

In this embodiment, tinning is applied to the outer surface 5*a* of each of the plurality of element wires 5 forming the core wire 3 of the wire 2 and also to the wire connection portion 9 of the LA terminal 7. Therefore, the electrical resistance between the plurality of element wires 5 can be reduced, and also the electrical resistance between the plurality of element wires 5 and the wire connection portion 9 can be reduced. Therefore, the stable electrical connection between the core wire 3 of the wire 2 and the LA terminal 7 can be positively obtained.

Furthermore, in the wire connection portion 9, tinning is applied to the surface 10*a* of the bottom plate portion 10 (on which the exposed portion of the core wire 3 disposed at the end portion 2*a* of the wire 2 is to be superposed) and also to the opposed inner surfaces 11*a* of the pair of core wire crimping piece portions 11 formed on and extending respectively from the widthwise-opposite side edges of the bottom plate portion 10 so as to hold the core wire 3 between them and the bottom plate portion 10. Therefore, the portion of the wire connection portion 9 to which the tinning is applied can be reduced. Therefore, the increase of the cost due to the tinning applied to the LA terminal 7 can be suppressed.

Figure 5:
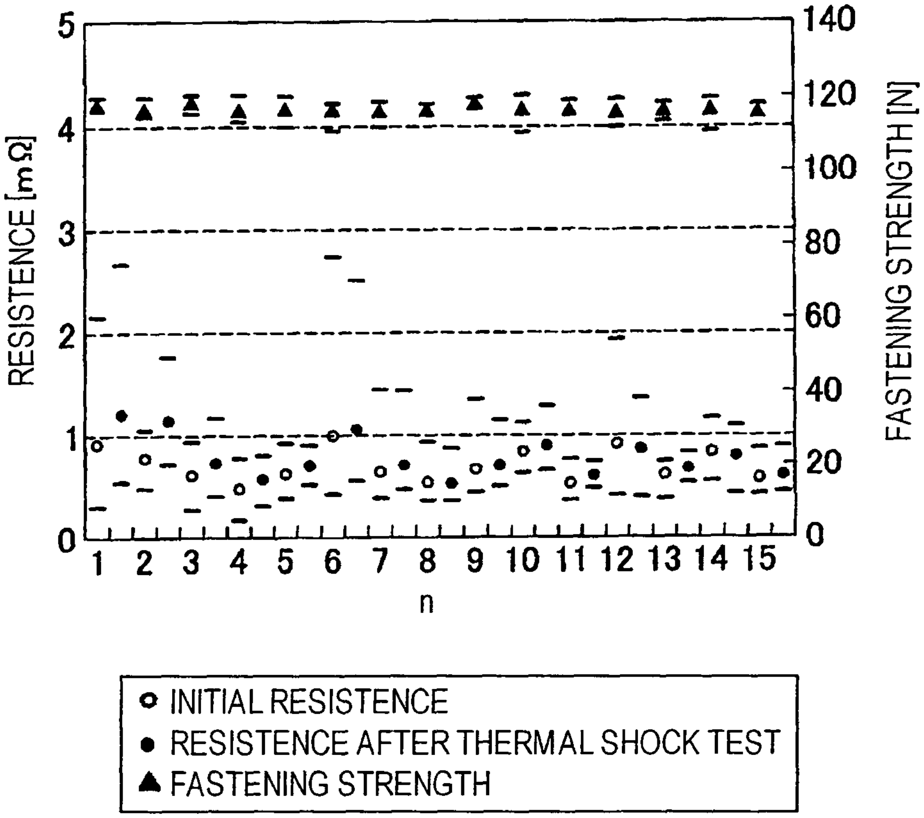
FIG. 5 is a graph showing an electrical resistance and a fastening strength of a connected portion of each of comparative terminal-equipped wires between a core wire and a terminal.
Figure 6:
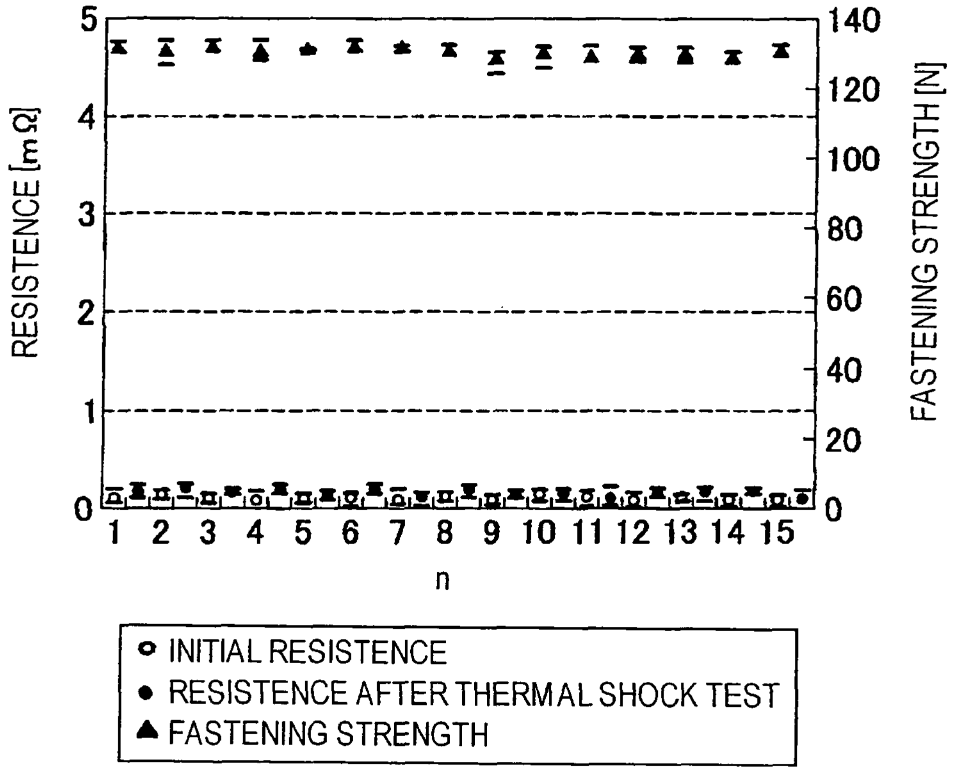
FIG. 6 is a graph showing an electrical resistance and a fastening strength of a connected portion of each of terminal-equipped wires of the present invention between a core wire and a terminal.

Next, the inventor of the present invention conducted Test 1 and Test 2 (described later) for products of the present invention (that is, terminal-equipped wires of the above embodiment) and products (comparative terminal-equipped wires) of Comparative Example, and confirmed advantages of the present invention. Results thereof are shown in FIG. 5 and FIG. 6.

The product of the invention is a terminal-equipped wire 1 of the above embodiment, and a core wire 3 of the wire 2 is formed by twisting together 20 element wires 5, each having a diameter of 0.18 mm and having a tin plating formed on its outer surface 5*a*, a cross-sectional area of the core wire 3 being 0.5 $mm^2$.

The product of Comparative Example (hereinafter often referred to as "comparative product") is a terminal-equipped wire having a core wire 3 formed by twisting 20 element wires 5 together, and tinning is not applied to an outer surface 5*a* of each of the element wires 5 and also to a surface 10*a* of a bottom plate portion 10 of a wire connection portion 9 and opposed inner surfaces 11*a* of a pair of core wire crimping piece portions 11.

(Test 1)

Test 1 will be described referring to FIG. 5. A thermal shock test for evaluating the reliability of the products, in which a high-temperature condition (120° C.; 15 min.) and a low-temperature condition (−40° C.; 15 min.) are alternately created at 240 cycles, is conducted for the products of the invention and the comparative products, and the initial products (untested products) which are not subjected to the test and the post-test products (tested products) are prepared.

Next, with respect to each of the initial products (untested products) and post-test products (tested products) of the invention and each of the initial products (untested products) and post-test products (tested products) of Comparative Example, electric current of 20±5 mA was flowed through the element wires 5 of the core wire 3 of the wire 2 by numbers n of the element wires 5, and a voltage drop across the portion of the wire 2 lying between the connected portion between the core wire 3 of the wire 2 and the wire connection portion 9 of the LA terminal 7 and a region spaced 100 mm (see FIG. 3) from this connected portion was measured. Then, a value obtained by subtracting a voltage drop of the wire 2 from the above measured value was determined as an electrical resistance of the connected potion and was examined.

The results of the comparative products are shown in a graph of FIG. 5, and the results of the products of the invention are shown in a graph of FIG. 6. In each of the graphs of FIGS. 5 and 6, the abscissa axis represents the number n of element wires 5, and the ordinate axis at the left side of each graph represents the electrical resistance (mΩ).

It is clear from the graph of FIG. 5 that in the comparative products, the resistance for each of numbers n of the element wires 5 is not smaller than 0.5 mΩ. It is clear from the graph of FIG. 6 that in the products of the invention, the resistance for each of the element wires 5 is not larger than 0.5 mΩ. Therefore, it is clear that the product of the invention is smaller in the resistance (mΩ) than the comparative product. Namely, in the product of the invention, the electrical resistance between the plurality of element wires 5 as well as the electrical resistance between the plurality of element wires 5 and the wire connection portion 9 of the LA terminal 7 can be made smaller as compared with the comparative product.

Test 2 will be described referring to FIG. 6. With respect to each of the above-mentioned products of the invention and each of the above-mentioned comparative products, the LA terminal 7 was set on a testing device 20, and the wire 2 was pulled at a constant speed of 200 mm/min in its axial direction. A distance L between an end of the wire 2 opposite to the end portion 2*a* and the insulative sheath 4 is no more than 20 mm. Then, a load, obtained when the wire 2 was ruptured or was separated from the wire connection portion 9 of the LA terminal 7, was measured for each of the element wires 5 of the core wire 3 of the wire 2. The results of measurement of the comparative products are shown in the graph of FIG. 5, and the results of measurement of the products of the invention are shown in the graph of FIG. 6. In each of the graphs of FIGS. 5 and 6, the abscissa axis represents the number of element wires 5, and the ordinate axis at the right side of each graph represents a fastening strength (N).

It will be appreciated from the graph of FIG. 5 that in the comparative products, the fastening strength is not larger than 120 N for each of the element wires 5. It will be appreciated from the graph of FIG. 6 that in the products of the invention, the fastening strength is not smaller than 120 N for each of the element wires 5. Therefore, it is clear from this that the product of the invention is higher in the fastening strength (N) than the comparative product.

The terminal-equipped wire 1 of the above embodiment is constructed such that the LA terminal 7 is fixedly secured to the end portion 2*a* of the wire 2 having the core wire 3 formed by twisting the plurality of element wires 5 together. However, in the present invention, there may be provided a construction in which an LA terminal 7 is fixedly secured to end portions 2*a* of a plurality of wires 2.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

The present application is based on Japanese Patent Application No. 2009-194254 filed on Aug. 25, 2009, the contents of which are incorporated herein for reference.

INDUSTRIAL APPLICABILITY

The present invention is extremely useful in providing a terminal-equipped wire in which stable electrical connection between a core wire of the wire and a terminal can be positively obtained.

REFERENCE SIGNS LIST

1 terminal-equipped wire
2 wire
2*a* end portion
3 core wire
4 insulative sheath
5 element wires
5*a* outer surface
6 tin plating
7 LA terminal
9 wire connection portion
10 bottom plate portion
10*a* surface
11 core wire crimping piece portion
11*a* opposed inner surfaces
13 tin plating

The invention claimed is:

1. A terminal-equipped wire comprising:

a wire including a core wire and an insulative sheath covering a part of the core wire, the core wire having a plurality of conductive element wires; and a terminal including a wire connection portion connected to the core wire at an end part of the wire where the core wire is exposed and a sheath crimping portion connected to the insulative sheath, wherein only an outer surface of each of the element wires and inner surfaces of the wire connection portion are tinned, wherein the wire connection portion includes:

a pair of crimping pieces; and a bottom plate, disposed between the pair of the crimping pieces, and having a face on which the exposed core wire is mounted, so that the core wire is crimped by the pair of crimping pieces and the bottom plate, wherein only faces of the pair of the crimping pieces opposing each other and a portion of the face of the bottom plate which is in contact with the exposed core wire are tinned, and wherein the core wire and the wire connection portion are connected only by crimping the pair of crimping pieces.

* * * * *